Aug. 2, 1966  F. DUDTE  3,263,801
MATERIAL DISCHARGING APPARATUS
Filed Nov. 27, 1964
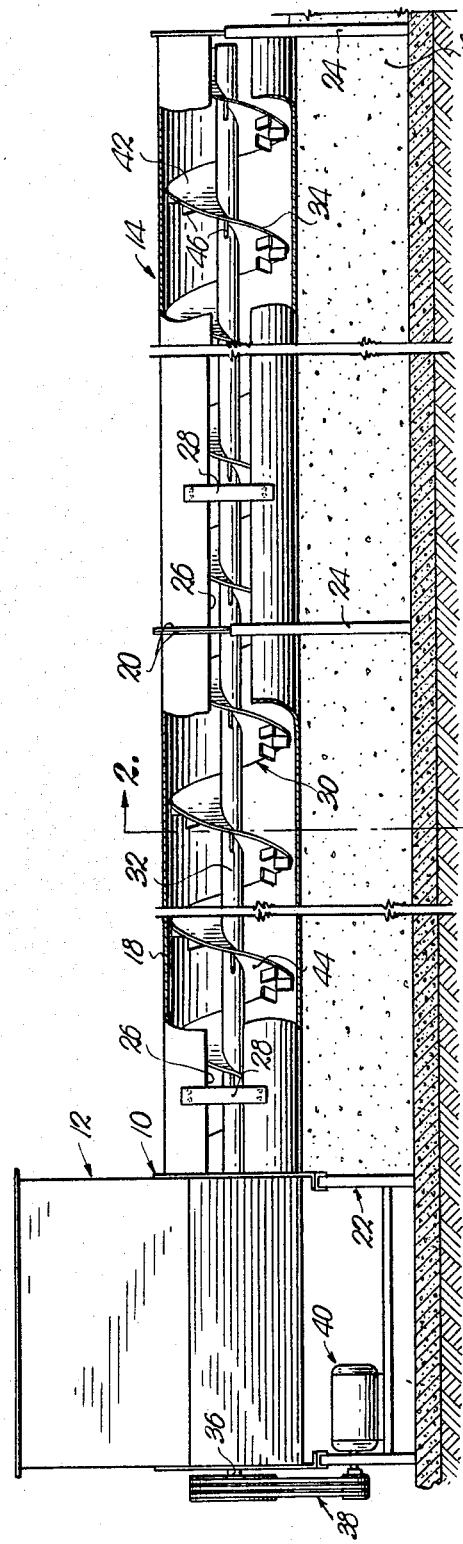
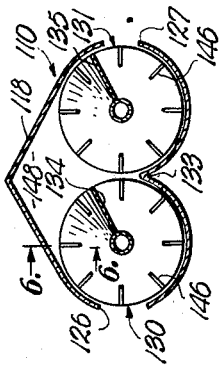
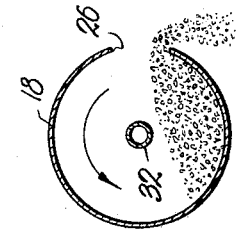
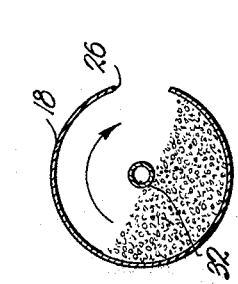
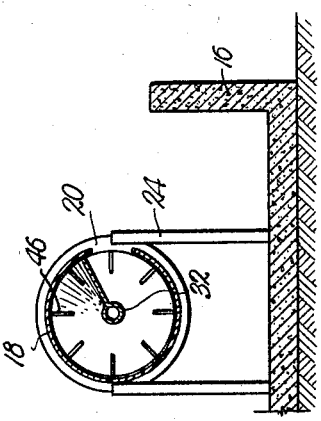
INVENTOR.
Fred Dudte
BY
Hovey, Schmidt, Johnson & Hovey
ATTORNEYS

United States Patent Office 3,263,801
Patented August 2, 1966

3,263,801
MATERIAL DISCHARGING APPARATUS
Fred Dudte, Newton, Kans., assignor to Harper and Sauder, Inc., Eureka, Ill., a corporation of Illinois
Filed Nov. 27, 1964, Ser. No. 414,146
7 Claims. (Cl. 198—213)

This invention relates to material handling structure and, more particularly, to apparatus for discharging particulate material along an elongated station.

While it is recognized that the apparatus of this invention may find a wide variety of uses, it has been found particularly beneficial for use in livestock feeding operations where it is necessary to distribute grain and other livestock feeding material along an animal-accessible feed bunk or trough. Because of the highly competitive nature of the livestock feeding industry and the necessity for effecting maximum animal weight gain while keeping labor costs to a minimum, the trend in recent years has been to the utilization of mechanized livestock feeding apparatus. Such feeding devices mechanically remove the feed from a feed bin or a hopper and transfer it to a bunk for subsequent consumption by the livestock. The devices are often electrically controlled for activation in timed sequence so that the entire livestock feeding operation can be carried out with little or no operator attention.

Elongated feed bunks are conventionally utilized to simultaneously accommodate a relatively large number of animals. This has given rise to the need for feed distribution systems which can deliver the feed for discharge along the entire length of the feed bunks. One major disadvantage of heretofore known distribution apparatuses has been the inability of the devices to discharge a uniform amount of feed at all points along the bunks. It has been a fault of such devices to discharge a relatively great amount of feed near the end of the conveyor which is closest to the source of supply and an ever decreasing amount along the feed bunk as the opposite end of the bunk is approached. This condition hampers efforts to provide uniform rations to all animals regardless of each animal's particular location at the feed bunk.

Further, presently known feeding structures have the characteristic of discharging the feed at one end of the bunk initially followed by subsequent discharge along the bunk at a time dependent upon the relative proximity of the point of discharge from the end of the feed conveyor. This condition has the tendency to attract the animals to the end of the bunk which is first supplied with the feed. Such crowding is undesirable and can lead to injury and trampling of the animals.

Acordingly, it is the primary object of this invention to provide material-discharging apparatus which is capable of distributing a uniform supply of material at all points along an elongated discharge station.

Another very important object of the instant invention is to provide apparatus having the desirable characteristic of discharging material to all points along an elongated station at the same time.

Still a further object of this invention is to provide structure capable of achieving the foregoing objects yet which may be entirely automatic and requires very little, if any, operator attention.

Yet another very important object of the invention is to provide apparatus capable of discharging a wide variety of materials such as animal feeds or the like, and which may be economically fabricated through the use of commonly available tools and materials.

Still another object of the instant invention is the provision of material handling and discharging apparatus which stirs and mixes the material thoroughly while the material is being distributed and discharged along an elongated station so that the material is prevented from separating into its component parts, thereby insuring that all points along the station are provided with material of uniform constituency.

Another object of this invention is to provide apparatus capable of handling a wide variety of material, particularly animal feed composed of relatively fine or bulky components or a mixture of both.

Further, it is another object of the present invention to provide structure having a pair of juxtaposed conveyor screws which are individually operable for discharging material from either side of the apparatus, yet which have the capability of operating to transfer material from one screw to the other to augment the discharge of material along a single side of the apparatus if desired.

These and other objects of this invention will be further explained or will become apparent from the following specification and appended claims.

In the drawing:

FIGURE 1 is a side elevational view of apparatus embodying the principles of this invention illustrating a typical installation thereof to supply material to a feed bunk, parts being broken away and appearing in cross section to reveal details of construction, the feed bunk being shown in vertical cross section;

FIG. 2 is a fragmentary, vertical, cross-sectional view taken along line 2—2 of FIG. 1;

FIG. 3 is a vertical, cross-sectional view through the conveyor tube showing the approximate level of the material in the tube when the screw is rotated in the direction indicated by the arrow, the screw vane being removed for clarity;

FIG. 4 is a view similar to FIG. 3 showing the approximate level of material when the screw is rotated in the opposite direction;

FIG. 5 is a vertical, cross-sectional view of a modified form of the conveyor; and FIG. 6 is a fragmentary, cross-sectional view taken along line 6—6 of FIG. 5.

Material discharging apparatus embodying the principles of the instant invention is broadly numerated 10 in the drawing and includes a hopper 12 and an elongated conveyor assembly 14 in communication with hopper 12 and extending substantially horizontally therefrom. Assembly 14 extends laterally from hopper 12 and is illustrated in typical disposition supported over an elongated animal feed bunk or trough 16.

Assembly 14 comprises a transversely circular tube 18 having one end thereof secured to the outer side wall of hopper 12. Tube 18 may comprise a plurality of sections having flanges 20 at the ends thereof whereby the flanges 20 may be bolted together to construct a tube 18 of any desired length determined by the number of tube sections integrated into the completed tube 18. It will be readily understood that the length of tube 18 depends upon the length of bunk 16.

Hopper 12 is mounted on a support 22 which may conveniently be located proximal a source of material to be distributed by apparatus 10 whereby the material can be directed into the upper open end of hopper 12. Tube 18 is supported in vertically spaced relationship with the bottom of bunk 16 at spaced points along the length of tube 18 by upright standards 24. Standards 24 may be bolted to flanges 20 and tube 18 is releasably secured to hopper 12 so that tube 18 may be rotated with respect to hopper 12. Provision is made for such relative rotation of tube 18 with respect to hopper 12 in order to permit selective adjustment of an elongated opening 26 in the side wall of tube 18 to any desired relative disposition in vertically spaced relationship with the bottom of tube 18. Opening 26 extends the entire length of tube 18 and the opposed edges of opening 26 are maintained in predetermined spaced relationship by a series of rigid spacers 28 having the ends thereof welded to tube 18 and spanning the distance transversely across opening 26.

An elongated conveyor screw 30 comprising an elongated, tubular member 32 and a helical vane 34 carried by member 32, as illustrated in FIG. 1, is received within tube 18 and extends the entire length of the latter and into hopper 12. A shaft 36 rigidly secured to member 32 protrudes from hopper 12 and is operably coupled by a drive 38 to a prime mover which may take the form of an electric motor 40.

Vane 34 is of conventional configuration and comprises a leading surface 42 configured to push material from within hopper 12 and distribute the material throughout the entire length of tube 18 when screw 30 is rotated in a clockwise direction as indicated by the arrow in FIG. 3. The trailing surface 44 of vane 34 has a series of fins 46 rigidly mounted thereon and projecting outwardly therefrom as illustrated in FIGS. 1 and 2. In the embodiment of apparatus 10 chosen for illustration, fins 46 are of generally rectangular configuration and have one elongated edge thereof welded to surface 44 so that the fins 46 project substantially perpendicular to surface 44.

Screw 30 may be supported within tube 18 by suitable bearings (not shown), or the outer peripheral edge of vane 34 may be permitted to ride upon the inner surface of tube 18. When it is desired to distribute material throughout the entire length of conveyor assembly 14 so that the material will be ready for discharge from the latter, screw 30 is rotated in the direction of the arrow illustrated in FIG. 3 by motor 40. This withdraws the material from hopper 12 and distributes the same evenly along tube 18, it being understood that screw 30 is operated so that material is caused to be moved to the end of conveyor assembly 14 which is remote from hopper 12.

As the material is moved away from hopper 12 it assumes the approximate position illustrated schematically in FIG. 3 due to the configuration of the leading surface 42 of vane 34 which tends to move the material away from opening 26. When sufficient material has been distributed along tube 18, motor 40 is reversed to cause screw 30 to rotate in the opposite direction. The trailing surface 44 of vane 34 then moves the material toward the approximate position thereof illustrated in FIG. 4 and toward opening 26. This causes the material to spill over the lower edge of opening 26 and to be discharged from the interior of tube 18 and into feed bunk 16. Manifestly, screw 30 may be operated in the direction of the arrow in FIG. 3 over a sufficient time interval to substantially fill tube 18 before the direction of rotation of the screw is reversed. Continued rotation in the opposite direction will then discharge all or substantially all of the material from the tube.

The fins 46 on surface 44 serve as impeller means when screw 30 is rotated in the direction of the arrow in FIG. 4 to enhance the discharging of the material through opening 26 as will be understood. Although the fins 46 are substantially out of engagement with the material as screw 30 is rotating in the clockwise direction, as viewed in FIG. 3, they come into play to knock the material toward opening 26 immediately upon reversal of the direction of rotation of screw 30.

Apparatus 10 has been found to be particularly useful in animal feeding operations wherein it is necessary to distribute the feed along bunk 16 in a manner to insure that equal rations are present for all of the animals to be accommodated around the feed bunk. It is often necessary that the animal feed be comprised of a mixture of several components. Frequently certain of the components comprise relatively bulky material, while other components consist of finely ground grains and concentrates.

The operation of screw 30 for distributing the material and the fins 46 engaging the material to move the latter through opening 26, cooperate to insure a thorough agitation and admixing of the material to present a uniform ration for each animal. If dictated by the characteristics of the material being discharged by apparatus 10, tube 18 may be rotated as previously explained to raise or lower opening 26 with respect to the bottom of the tube for enhancing the rate of discharge of the material. Further, opening 26 may be inclined downwardly as the end of tube 18 remote from hopper 12 is approached to insure that the quantity of material discharged along the entire length of tube 18 is uniform. Thus, if screw 30 has a tendency to carry more material in the proximity of hopper 12, the downward inclination of opening 26 permits slightly more of the material to be retained within tube 18 near hopper 12 to equalize the quantity of discharge.

It will be readily understood that suitable control means (not shown) may be operably coupled with motor 40 for cycling of the latter to cause cyclic activation of apparatus 10 at timed intervals. Thus, apparatus 10 may, if desired, be preset so that predetermined quantities of material may be discharged therefrom at selected spaced intervals. This permits the use of apparatus 10 in installations such as feed lots or the like where animals may be fed as required with little or no need for operator attention.

Referring now to FIGS. 5 and 6, a modified form of material discharging apparatus is broadly designated 110 and includes a tube 118 configured as illustrated in FIG. 5 to accommodate a pair of juxtaposed, identical rotatable screws 130 and 131. It will be noted that tube 118 is configured to provide an upright baffle 133 between the screws 130 and 131 and partially separating the same. An elongated opening 126 in tube 118 is disposed adjacent screw 130 and a similar opening 127 extends the length of tube 118 adjacent screw 131 as illustrated.

Each of the screws 130 and 131 are provided with fins 146 on the trailing surfaces of the helical vanes 134 and 135 respectively. It will be noted in FIG. 6 that fins 147, which may be identical to fins 146, are mounted in similar manner on the leading surface of vane 134. Although not illustrated in the drawing, it is contemplated that the leading surface of vane 135 of screw 131 could also be provided with fins 147. It is contemplated that tube 118 will be provided with hopper means similar to hopper of apparatus 10 to provide a source of material to be discharged by apparatus 110.

The operation of screws 130 and 131 are identical to the operation of screw 30 which has been previously explained. However, screws 130 and 131 are individually rotatable in either direction by drive means (not shown). When screw 130 is rotated in a counterclockwise direction as illustrated in FIG. 5, vane 134 not only moves the material away from the hopper and distributes the same along tube 118, but it also has a tendency to move the material up over baffle 133 toward screw 131. When screw 130 is reversed, the material is discharged through opening 126. Similarly, when screw 131 is rotated in a clockwise direction as illustrated in FIG. 5, the material is distributed and also moved toward screw 130. Reversing the direction of screw 131 discharges the material through opening 127.

It will be readily understood that the screws 130 and 131 can thus be utilized individually or together to transfer material from the hopper and distribute the same into tube 118 from whence it may be discharged through opening 126 or 127, or both. Further, if a greater discharge is desired, as for example through opening 127, both screws 130 and 131 may be operated in a counterclockwise direction thereby transferring material carried by screw 130 over baffle 133 and into screw 131 so that the latter may discharge the material carried by both screws through opening 127. The fins 147 on the leading edge of vane 134 serve as impeller means to enhance the transfer of material over baffle 133.

The need for fins 147 is dictated by the type of material being handled by apparatus 110, it being understood that it would not be necessary to provide fins 147 for handling of certain materials. Further, it has been found that the need for fins 147 on the leading edge of vane 134 is more pronounced at the end of screw 130 remote from the hopper because of the lesser amount of material which may be carried by screw 130 at that location.

In the interest of brevity, the operation of screws 130 and 131 to effect discharge of material through opening 126 will not be set forth, it being understood that the directions of rotation of screws 130 and 131 would be reversed from those set forth with respect to the operation of apparatus 110 for discharging material through opening 127. Manifestly, apparatus 110 is capable of serving two feed bunks and can be cycled to effect discharge of material therein as necessary.

Further, apparatus 110 may be constructed in a manner to permit raising or lowering of the openings 126 and 127 individually with respect to the bottom of tube 118 for adjusting the rate of discharge of the material therefrom as explained with respect to tube 18 of apparatus 10. Similarly, the openings 126 and 127 may also be inclined downwardly as the end of tube 118 remote from the hopper of apparatus 110 is approached, thus insuring an even discharge rate throughout the entire length of tube 118. The irregular configuration of tube 118 provides a space 148 above screws 130 and 131 to increase the capacity of the tube. Thus, a substantial amount of material can be distributed throughout the length of tube 118 before it is necessary to reverse the direction of rotation of the screws for discharging the material from the tube.

Having thus described the invention, what is claimed as new and desired to be secured by Letters Patent is:

1. Apparatus for discharging particulate material from a source thereof along an elongated discharge station comprising:
    an elongated, generally horizontally disposed conveyor tube adapted to communicate with said source for receiving material therefrom into one end of the tube, said tube having an elongated opening in the side wall thereof extending longitudinally of the tube in vertically spaced relationship with the bottom of the tube;
    an elongated, rotatable screw in the tube, said screw including a helical vane having a leading surface and a trailing surface, the leading surface being configured to push the material away from said opening and toward the other end of the tube when the screw is rotated in one direction and the trailing surface being configured to push the material toward the opening when the screw is rotated in the opposite direction;
    reversible drive means operably coupled with the screw for driving the latter; and
    impeller means on the vane for knocking the material toward the opening to facilitate discharge of the material therethrough when the screw is rotated in said opposite direction.

2. Apparatus as set forth in claim 1, wherein said impeller means includes a plurality of fins carried by the vane for rotation therewith, said fins being disposed to engage the material to knock the latter toward said opening when the screw is rotated in said opposite direction.

3. Apparatus as set forth in claim 2, wherein said fins are disposed on said trailing surface, the fins engaging the material substantially only when the screw is rotated in said opposite direction.

4. Apparatus as set forth in claim 1, wherein said impeller means includes a series of projections carried by the vane and spaced along the latter, said projections extending outwardly from the vane for engaging the material to augment moving of the material to said opening when the screw is rotated in said opposite direction.

5. Apparatus for discharging particulate material from a source thereof along an elongated discharge station comprising:
    an elongated, generally horizontally disposed conveyor tube adapted to communicate with said source for receiving material therefrom into one end of the tube, said tube having a pair of spaced side walls, each side wall having an elongated opening therein extending longitudinally of the tube in vertically spaced relationship with the bottom of the tube;
    a pair of elongated, juxtaposed, rotatable screws in the tube, there being a screw adjacent each opening respectively with each screw including a helical vane having a leading surface and a trailing surface, there being a baffle in the tube extending longitudinally thereof between the screws, the leading surface of each screw being configured to push the material toward the baffle and along the tube when the corresponding screw is rotated in one direction and the trailing surface of each screw being configured to push the material toward the proximal opening when the corresponding screw is rotated in the opposite direction;
    impeller means on the vanes for knocking the material toward and through said openings; and
    reversible drive means operably coupled with each screw respectively for individually driving each screw in either direction, whereby either of said screws may be rotated in a direction to discharge material from a corresponding opening and either screw may be selectively rotated in a direction to transfer material past said baffle and into the path of travel of the vane of the other screw.

6. Apparatus as set forth in claim 5, wherein said impeller means includes a series of fins projecting outwardly from the trailing surfaces of the respective vanes.

7. Apparatus as set forth in claim 5, wherein is included a series of fins on the leading edge of at least one of said vanes to facilitate transfer of material past said baffle to said other screw.

References Cited by the Examiner

UNITED STATES PATENTS 2,867,314  1/1959  Hansen _____ 198—64

EVON C. BLUNK, *Primary Examiner.*

E. SROKA, *Assistant Examiner.*